Figure 3:
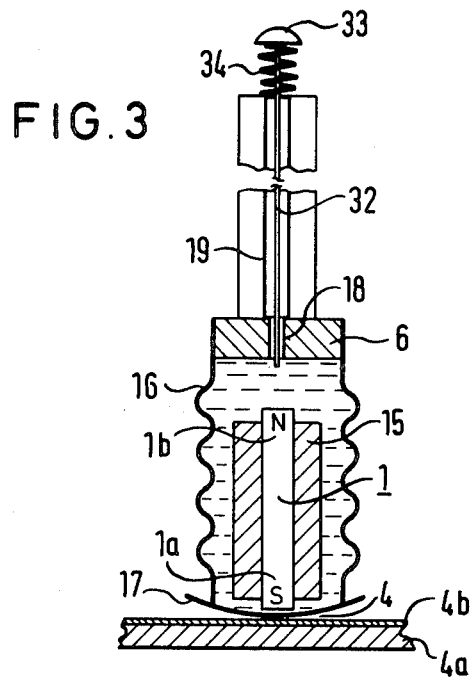

United States Patent [19]

Nix nee Saxler

[11] Patent Number: 4,459,550
[45] Date of Patent: Jul. 10, 1984

[54] NON-MAGNETIC LAYER THICKNESS TESTER UTILIZING A PERMANENT MAGNET

[76] Inventor: Maria Nix nee Saxler, Robert Perthel Str. 2, 5000 Köln 60, Fed. Rep. of Germany

[21] Appl. No.: 264,615

[22] Filed: May 18, 1981

[30] Foreign Application Priority Data

May 22, 1980 [DE] Fed. Rep. of Germany ....... 3019540

[51] Int. Cl.³ .................... G01B 7/10; G01R 33/12
[52] U.S. Cl. .................................................. 324/230
[58] Field of Search ................................ 324/229–231

[56] References Cited

U.S. PATENT DOCUMENTS 3,441,840 4/1969 Randle ................................. 324/230
3,453,984 7/1979 Gerek .................................. 324/230
3,662,576 5/1972 Girlatschek ......................... 324/229

Primary Examiner—Gerard R. Strecker
Assistant Examiner—Walter E. Snow
Attorney, Agent, or Firm—Armstrong, Nikaido, Marmelstein & Kubovcik

[57] ABSTRACT

An instrument for measurement of thickness of a non-magnetic layer on a magnetic or magnetizeable substrate including a permanent magnet having a test pole which is resting against the non-magnetic layer and an opposite pole, a comparison body arranged at a distance from the opposite pole, a mechanism for adjusting the spacing of the comparison body from the opposite pole until the magnetic fields between the comparison body and the opposite pole and between the substrate and the test plate are equal and a device for displaying such spacing. In this manner, the gap between the comparison body and the opposite pole of the magnet becomes the same as the spacing between the test pole and the substrate which is the thickness of the non-magnetic layer. Different embodiments are presented. In three of the embodiments, when the magnetic fields become equal at both poles of the magnet, the magnet moves away from the non-magnetic substrate. In the fourth embodiment, the actual magnetic fields are measured and when they become equal, a drive mechanism which moves the comparison body towards the opposite pole is disengaged.

25 Claims, 5 Drawing Figures

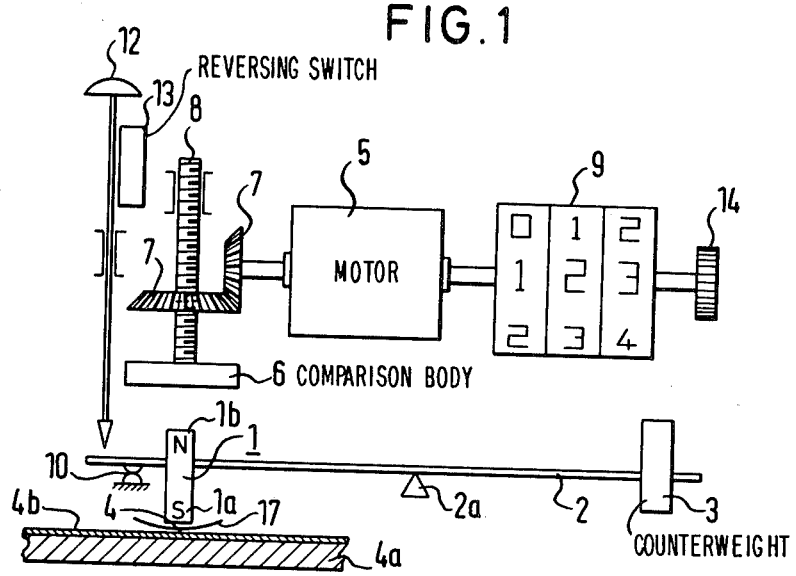
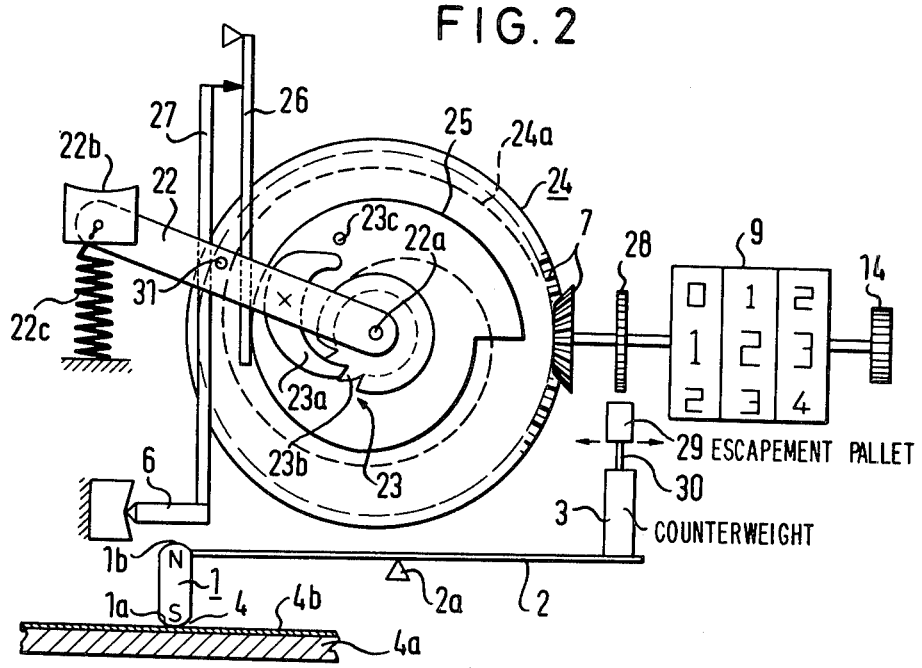

NON-MAGNETIC LAYER THICKNESS TESTER UTILIZING A PERMANENT MAGNET

The invention concerns an instrument for measuring the thickness of a non-magnetic layer on a magnetic or magnetizable substrate.

Film-thickness testers for measuring non-magnetic layers on magnetic or magnetizable substrates, for instance iron particles or iron sheetmetal, have been successfully used in industry. These testers are based on the adhesion of a permanent magnet. A spring is tensioned until the magnet is detached from the test site. The spring force in that case is a measure of the thickness of the non-magnetic layer on the magnetic substrate, which can be indicated in mm or microns following appropriate calibration.

The advantage of these manual test instruments essentially is in their simple design. This advantage however must be traded off against substantial drawbacks. The test value is much affected by the manual skill of the user. Slight motions or vibrations during the measurement cause premature separation of the permanent magnet, resulting in high measurement unreliability.

Moreover, when such an instrument is calibrated, it is on the basis of a specific field strength of the permanent magnet. If this strength varies only slightly, the calibration that was performed is no longer proper, and a readjustment is impossible because of the extremely non-linear relation between layer thickness and adhesion. However such a change in the field strength of the permanent magnet can easily come about, for instance under the effect of extraneous magnetic fields, temperature changes, aging of the magnet or impact and vibrations. Consequently this source of error can never be ruled out.

Another drawback of the known film-thickness test instruments based on adhesion is that each permanent magnet has its own characteristic curve, that is, the relation between the spring force and the layer thickness must be ascertained for each instrument and the corresponding scale must be drawn up individually. This is especially uneconomical in mass production.

Because as, already mentioned, the relation between the adhesion and the film thickness is extremely non-linear, it is rather difficult for the neophyte to read off the test values. Digital display is practically impossible, because digital display assumes a linear relationship between the adhesion and the film thickness. However it is precisely such a digital display which nowadays is desired by many users because a digital display presents an unambiguous, easily read test result. Furthermore the digital display of the test value is required for any further processing of the test values, for instance when logging the test values by a printer.

To avert these drawbacks, the previous invention, U.S. application Ser. No. 105,223 filed Dec. 19, 1979, now U.S. Pat. No. 4,400,665, therefore has proposed an instrument to measure the thickness of coatings on a substrate which is based on the gap-dependent electromagnetic interaction, that is, not on the basis of the adhesion principle, but on the basis of induction. This method however suffers from the drawback that relatively complex circuits are needed, so that precisely the essential advantage of the adhesion testers, namely their easy handling, will be lost thereby. Also, such inductively operating layer thickness testers can easily be hampered by extraneous influences.

It is therefore the object of the invention to create an instrument for measuring the thickness of a non-magnetic layer on a magnetic or magnetizable substrate wherein the above mentioned drawbacks do not occur.

The invention in particular proposes an instrument which while retaining the essential advantages of the adhesion-principle layer thickness testers—namely easy handling also—allows a digital display of the test value.

The present invention solves the above-noted problems by the features of a permanent magnet having a test pole and an opposite pole, with the test pole being for resting against a non-magnetic layer, a comparison body with property similar to those of the substrate, means for adjusting the spacing of the comparison body from the opposite pole until the magnetic fields between the comparison body and the opposite pole and between the substrate and the test pole are equal, and a means for displaying the spacing. Drive means can be provided, such as an electric motor or a spring work motor for displacing the comparison body.

The advantages achieved by the invention rest on the basic concept to remain "consistent within the magnetic system", that is, to compare magnetic forces with magnetic forces, rather than for instance by a spring force as is the case in the known film thickness testers. Concretely this means therefore that the physical relations, ie the magnetic relations at the testing pole can be simulated to the most accurate extent at the associated opposite pole. In this manner all the advantages of a compensation method can be achieved.

To that purpose, a comparison body appropriately consisting of iron is brought near the opposite pole of the permanent magnet of which the testing pole rests on the non-magnetic layer until the same physical relations, namely the same magnetic field is obtained in the comparison air gap, ie the air gap between the opposite pole and the comparison body, as prevail in the "test air gap", ie in the gap between the magnetic or magnetizable material and the test pole. A given width of the comparison air gap then corresponds to a given thickness of the layer being measured. This is because the field intensity in the comparison air gap is precisely the same as in that of the layer being measured, and because the force exerted by the comparison body on the opposite pole of the permanent magnet is exactly the same as that from the magnetic or magnetizable substrate on the test pole. At this point therefore the distance between the comparison body and the opposite pole represents a measure of the thickness of the non-magnetic layer, so that it is only this distance which needs being displayed in order to obtain the corresponding thickness following calibration.

This equality of the magnetic fields as a rule will not be the case when the gaps between the comparison body and the opposite pole on one hand and the test pole and the substrate on the other are equal, because the size of the comparison body is a strong factor. The exact measure is obtained only when the magnetic fields are the same in both gaps.

Several methods are available to implement this basic concept on an industrial scale. As regards one simple method operating on the adhesion principle, the permanent magnet is mounted to one end of a balance beam, so that the test pole is drawn away from the test site by a pivoting motion when the attraction of the comparison body becomes larger than that of the substrate.

Appropriately the comparison body is displaced by a motor means, whether electrical or spring type.

The embodiment employing the spring-wound motor offers the advantage of not requiring an external power supply. In both cases the display can be by means of drum counters which in the second embodiment can also be driven by the spring-wound motor.

In another embodiment also requiring no external power supply, the permanent magnet is free-floating in a liquid inside a bellows of which the upper end is sealed by the comparison body. If now the bellows is compressed to decrease the gap between the comparison body and the opposite pole, some amount of liquid will be discharged from the bellows, which represents a direct measure for the gap between the opposite pole and the comparison body. The discharged liquid can be displayed for instance in a glass capillary tube provided with a corresponding scale. If the magnet moves against the comparison body, the discharge aperture is sealed, whereby the test value is retained and can be read off later still.

These three embodiments operate on the adhesion principle, which suffers from the drawback that for slight impacts on the tester the test pole already may be torn away from the layer to be measured. This drawback is averted in a further embodiment wherein the magnetic field between the opposite pole and the comparison body on one hand and between the test pole and the substrate on the other will be measured directly. This magnetic field measurement can be implemented by a conventional magnetic field probe, appropriately using field plates, ie semiconductors responding to magnetic fields and mounted on ceramic plates. These ceramic plates are highly wear-proof and therefore their thickness hardly varies even after lengthy use.

In this embodiment, use is made of stationary permanent magnets, so that only the comparison body must be displaced, for instance by using an electric motor or a spring-wound motor. In this case too a drum-counter can be used to display the ascertained test value.

Employing the described comparison process, the relation between the thickness of the layer being tested and the display is linear, so that the test value obtained can be displayed directly in digital form without requiring an expensive linearization network. Moreover a scale applicable to all instruments can be used; this simplifies especially mass production substantially.

Because the required comparison force is provided by the permanent magnet itself, and as all alterations, if any, of the properties of the permanent magnet take place evenly at both poles, the test result is not affected by the above factors, namely the aging of the magnet, its temperature behavior, or extraneous magnetic fields, any amplifier drifts or any fluctuations in the power supply, for instance from the battery required for the electric motor.

The invention is discussed more comprehensively below in relation to the attached schematic drawings.

Figure 4:
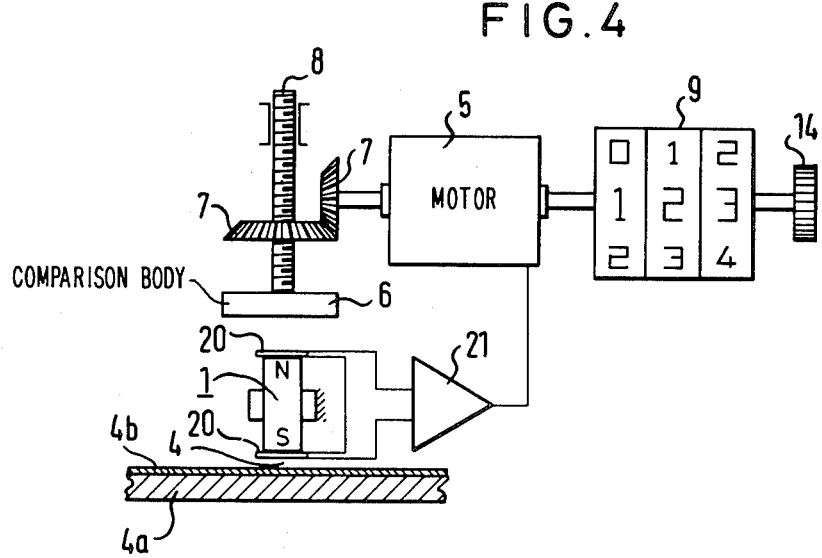
Figure 5:
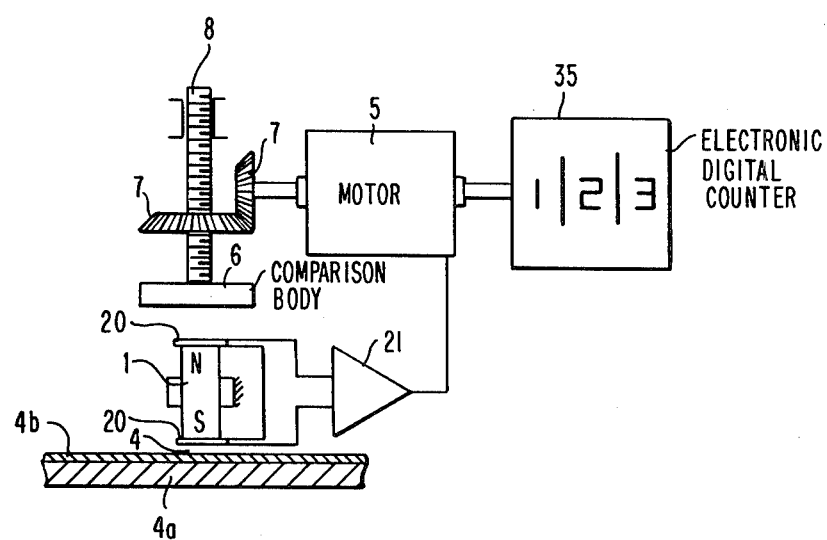

FIG. 1 is an embodiment based on the adhesion principle, the drive means being an electric motor, FIG. 2 is a further embodiment operating on the adhesion principle, the drive means being a spring wound motor, FIG. 3 is a third embodiment operating on the adhesion principle, with manual adjustment, FIG. 4 is an embodiment with direct measurement of the magnetic field, and FIG. 5 is an embodiment having an electronic digital counter.

As regards the embodiment of FIG. 1, a small permanent bar magnet 1 is mounted to a balance beam 2 pivoting about a stationary, horizontal shaft 2a. A mass 3 compensating the weight of the permanent magnet 1 is located at the other end of the balance beam 2, whereby the balance beam 2 in the absence of external forces is kept in an unstable equilibrium.

The lower pole of the permanent magnet 1 of FIG. 1, in this embodiment the south pole, is used as the test pole 1a and is deposited at a test site 4. The test site is the surface of a body comprising a non-magnetic layer 4b—of which the thickness is to be ascertained—on a magnetic or magnetizable substrate 4a.

The other pole of the permanent magnet 1, in this embodiment the north pole, acts as the opposite pole 1b and is located opposite a plate 6 made of a magnetic or magnetizable material, appropriately an iron plate.

The iron plate 6 is mounted to the lower end of a threaded spindle 8 driven by an electric motor 5 and two bevel gears 7. Depending on the direction of rotation of the drive shaft of the electric motor 5, the threaded spindle 8 moves up or down as shown in FIG. 1.

The drive shaft of the electric motor 5 moreover is coupled to a conventional drum counter 9 which is set according to the rotation of the drive shaft of the electric motor 5. The number displayed by the drum counter 9 represents a measure of the rotation of the drive shaft of the electric motor 5 and hence towards or away from the displacement of the iron plate in the direction of the opposite pole 1b.

To measure the thickness of the non-magnetic film 4b, the test pole 1a is deposited on some site of the surface of the non-magnetic layer 4b and the electric motor 5 is set into motion, whereby the iron plate 6 nears the opposite pole 1b. Immediately after passing through a state in which the same magnetic field exists in the comparison gap between the opposite pole 1b and the iron plate 6 as between the the substrate 4a and the test pole 1a, the permanent magnet 1 upon further decrease of the gap between the iron plate 6 and the opposite pole 1b moves upward and the test pole 1a is lifted off the test site 4. Due to the motion thus caused in the left end of the balance beam 2 in the upward direction, an electrical switch 10 is actuated, whereby the electric motor 5 is stopped. The number now displayed by the drum counter 9 corresponds to a given thickness of the non-magnetic layer 4b, so that, upon corresponding calibration of the instrument, the thickness also may be displayed directly.

To reset the instrument ready-for-use, a button 12 is manually depressed, which acts on the left end of the balance beam 2 and pivots the balance beam 2 counter-clockwise about the shaft 2a, whereby the test pole 1a is deposited again on the test site 4. As long as this button 12 is kept depressed, the electric motor 5, now controlled by a reversing switch 13, runs backward, whereby the iron plate 6 moves away from the opposite pole 1b and also the drum counter 9 is reset to zero.

A setting knob 14 is provided at the drum counter 9 for setting the null point of the drum counter 9.

The magnetic test pole 1a is protected by a cap 17 fastened to the housing. This provides simultaneously a dust-tight seal for the entire instrument.

FIG. 2 shows an embodiment differing essentially from the embodiment of FIG. 1 only in that in lieu of the electric motor 5, a spring wound motor is used to displace the iron plate 6 and to change the setting of the drum counter 9. Therefore only those components will be discussed below which are not provided in the embodiment of FIG. 1.

A lever 22 is pivotably supported at one end about a shaft 22a. A spring housing 24 rotates about the same shaft and contains a spiral spring 24a shown in dashed lines in FIG. 2. The other end of the lever 22 comprises a key 22b fixed to a compression spring 22c. By depressing the key 22b against the force of the compression spring 22c acting as a return spring, the lever 22 is pivoted counterclockwise about the shaft 22a, whereby the spiral spring 24a is wound through the ratchet mechanism 23. The ratchet mechanism 23 comprises a pawl 23a of which the tip enters a ratchet 23b. For the upper rest position of the lever 22, the pawl 23a is taken out of the ratchet 23b by means of a pin 23c so that the spiral spring 24a can unwind again. During this unwinding motion of the spiral spring 24a, the spring housing drives the drum counter 9 by means of the bevel gears 7. Simultaneously the iron plate 6 is displaced by the spring housing 24 by means of a spiral-shaped worm 25 and two levers 26 and 27, as this iron plate 6 is pivotably supported at one end.

To achieve a uniform unwinding of the spiral spring 25a, an escapement governor is mounted on the drive shaft of the drum counter 9, comprising a pallet wheel 28 and a pallet 29.

During the measurement process, the iron plate 6 displaced by the spiral spring 24a through the worm, and the lever system nears the opposite pole 1b of the permanent magnet. As soon as the magnetic field in the comparison gap exceeds the magnetic field in the tent gap and the opposite pole 1b is attracted by the iron plate 6, the balance beam 2 tilts so that a pin 30 mounted in the counterweight 3 engages the pallet 29 of the escapement governor and can block it, whereby the drum counter 9 also is displaced no further. In this manner it is possible to read a value directly corresponding to the thickness of the non-magnetic layer 4b off the drum counter 9.

To reset the instrument for operation, the lever 22 must be again depressed by means of the key 22b. Thereby a pin 31 fixed to the lever 22 comes to rest against the lever 27, and accordingly the iron plate 6 is pivoted widely out of the way of the opposite pole 1b of the permanent magnet 1. As a result, the attraction between the test pole 1a and the substrate 4a exceeds the attraction between the opposite pole 1b and the iron plate 6, so that the balance beam 2 with the magnet 1 of the FIG. 2 is pivoted counterclockwise about the shaft 2 and the test pole 1b again rests on the test site 4.

To the extent possible in construction, the iron plate should be pivoted away from the opposite pole 1b as much as possible to prevent errors in measurement which might be due to passing through the inner loop of the hysteresis curve of the magnet.

FIG. 3 shows an embodiment also operating on the adhesion principle but wherein the permanent magnet 1 is not fixed to a balance beam, rather it is kept floating in a liquid by means of a small buoyant body 15. The buoyant body 15 together with the permanent magnet 1 is located within a metal bellows 16 of which the upper end is sealed by the iron plate 6 while the cap 17 is provided at its lower end. A small borehole 18 is located at the center of the iron plate 6 and continues in a glass capillary tube 19. The bellows 16 is filled with a liquid.

When the cap 17 is placed on the measurement site 4, the permanent magnet 1 is attracted and adheres to the side of the cap 17 which is opposite the test site 4. Upon a slight pressure being exerted on the bellows 16, same contracts, so that the opposite pole 1b of the permanent magnet ever more nears the iron plate 6. At the same time the volume of the bellows is decreased thereby, so that the liquid passes through the aperture 18 in the iron plate 6 upward into the glass capillary tube 19. When the magnetic field in the comparison gap between the iron plate 6 and the upward opposite pole 1b is equal to the magnetic field between the test pole and the non-magnetic layer 4b, the permanent magnet moves upward and thereby seals the aperture 18 in the iron plate 6 providing access to the glass capillary tube 19. In this manner the height of the liquid column in the glass capillary tube 19 remains at a specific constant value which, in the presence of suitable calibration, can be directly read off as the measure of the thickness of the non-magnetic layer 4b.

A corresponding scale may be provided on the glass capillary tube 19.

To reset the instrument for operation, a long thin wire 32 passing at the upper end through the entire glass capillary tube 19 is slightly depressed so that passing through the borehole 18 it hits against the opposite pole 1b and forces the permanent magnet 1 downward; thereby the permanent magnet 1 again detaches from the iron plate 6 and remains adhering to the test site 4.

Due to the spring action of the bellows 16, the liquid then can flow back from the glass capillary tube 19 into the bellows 16.

The upper end of the wire 32 is provided with a button 33 to facilitate handling. Appropriately a spring 34 is provided between the upper end of the glass capillary tube 19 and the button, said spring being compressed when a pressure is applied to the button 33 and upon termination of this pressure forcing the wire 32 upward so that the wire 32 shall not block the borehole 18.

As mentioned before, the embodiments described so far operate on the adhesion principle and suffer from the drawback that the displaceably supported permanent magnet may come loose already for minute vibrations without there being an equality of the magnetic field in the test and compensation gaps.

This drawback is avoided in the embodiment shown in FIG. 4 in that the magnetic field is measured directly.

In this embodiment therefore the permanent magnet 1 is solidly integrated and provided at both its poles with a thin magnetic field probe 20. A preferred magnetic field probe is a so-called "field plate", that is, a semiconductor affected by a magnetic field, which is mounted on a thin ceramic plate. Alternatively it is also possible to use Hall effect sensors, magnetic transistors or magnetic diodes.

The two magnetic field probes 20 are connected as a bridge of which the diagonal voltage is fed to an operational amplifier 21. The output of the operational amplifier 21 is connected to the electric motor 5 already discussed in relation to FIG. 1, which on one hand displaces the iron plate 6 and on the other hand sets the drum counter 9.

When the comparison gap, ie the air gap between the iron plate 6 and the opposite pole 1b is less or larger than the thickness of the non-magnetic layer 4b, the two magnetic field probes 20 will measure different magnetic fields, whereby the operational amplifier 21 drives the electric motor 5 and the comparison plate 6 is displaced by means of the bevel gears 7 and the threaded spindle 8 either upward or downward until the diagonal potential in the bridge reaches the null value. Thereupon the output signal of the operational amplifier 21 also becomes null, so that the electric motor 5 stops and, upon corresponding calibration, the thickness of the non-magnetic layer 4b can be read off the drum counter 9 or off the electronic digital counter 36 (FIG. 5).

This instrument permits continuous measurement, that is, a contour coated with a non-magnetic layer can be sensed continuously to ascertain the layer thickness in continuous manner.

I claim:

1. An instrument for the measurement of the thickness of a non-magnetic layer on a magnetic or magnetizeable substrate comprising:
   a permanent magnet having a test pole and an opposite pole, said test pole being for resting against the non-magnetic layer,
   a comparison body with properties similar to those of the substrate positioned facing said opposite pole,
   means for adjusting the spacing of the comparison body from said opposite pole until the magnetic fields between the comparison body and said opposite pole and between the substrate and the test pole are equal as indicated by beginning of movement of said permanent magnet from a first position resting substantially on said non-magnetic layer toward a second position away from said layer in the direction of said comparison body,
   means for displaying the spacing.

2. An instrument as claimed in claim 1, wherein said means for adjusting includes drive means for displacement of the comparison body, and wherein said means for displaying is operatively coupled to said drive means.

3. An instrument as claimed in claim 2, furhter comprising a balance beam pivotally mounted with said magnet being attached to one end thereof, said magnet thereby being pivotally moveable between said first position resting substantially on said non-magnetic layer and said second position away from said layer in the direction of said comparison body, and means for stopping said drive means when said magnet moves from said first to said second position.

4. An instrument as claimed in claim 3, wherein said drive means is an electric motor.

5. An instrument as claimed in claim 4, wherein said means for stopping comprises a switch having a stationary contact and a corresponding contact on said balance beam, said contacts being coupled to said electric motor.

6. An instrument as claimed in claim 3, wherein said drive means is a spring-wound motor.

7. An instrument as claimed in claim 6, wherein said means for stopping comprises a pin mounted on said balance beam and an escapement governor on said spring-wound motor.

8. An instrument as claimed in claim 3, further comprising means for moving said magnet from said second position to said first position.

9. An instrument as claimed in any one of claims 1, 2, 3, 4, 5, 6, 7, or 8, wherein said means for displaying is a drum counter.

10. An instrument for the measurement of the thickness of a non-magnetic layer or a magnetic or magnetizeable substrate comprising:
    a container having a lower end and an upper end, said lower end for resting on said layer,
    a liquid in said container,
    a permanent magnet having a test pole and an opposite pole, said magnet freely floating in said liquid in said container with said test pole facing said lower end,
    a comparison body with properties similar to those of the substrate mounted to the upper end of the container,
    means for varying the spacing between the comparison body from the opposite pole until the magnet fields between the comparison body and the opposite pole and between the substrate and the test pole are equal as indicated by beginning of movement of said permanent magnet from a first position with said test pole adjacent said non-magnetic layer toward a second position in the direction of said comparison body,
    means for displaying the spacing.

11. An instrument as claimed in claim 10, wherein said means for adjusting includes compressible side walls of said container and said means for displaying comprises a discharge opening in said upper end and means for holding the liquid displaced through said discharge opening when said side walls are compressed.

12. An instrument as claimed in claim 11, wherein said means for holding comprises a glass capillary tube provided with a scale and joined to said upper end at said discharge opening.

13. An instrument as claimed in claim 10, wherein said discharge opening is through said comparison body and upon contact of said opposite pole with said comparison body, said magnet seals said discharge opening.

14. An instrument as claimed in any one of claims 10, 11, 12, or 13 wherein said container is a bellows.

15. An instrument as claimed in any one of claims 10, 11, 12, or 13, further comprising a buoying body to which said magnet is mounted.

16. An instrument as claimed in any one of claims 12 or 13, further comprising a thin wire passable through said capillary tube to push said magnet away from said comparison body.

17. An instrument for the measurement of the thickness of a non-magnetic layer on a magnetic or magnetizeable substrate comprising:
    a permanent magnet having a test pole and an opposite pole, said test pole resting substantially against the non-magnetic layer,
    means for measuring magnetic field intensity mounted on said test pole and on said opposite pole,
    a comparison body with properties similar to those of the substrate positioned facing said opposite pole,
    means for adjusting the spacing of the comparison body from said opposite pole until the means for measuring indicates that the magnetic fields between the comparison body and and the opposite pole and between the substrate and the test pole are equal,
    means for displaying the spacing.

18. An instrument as claimed in claim 17, wherein said means for measuring is a pair of magnetic field plates mounted respectively on said opposite pole and said test pole.

19. An instrument as claimed in claim 17, wherein said means for adjusting includes drive means for displacement of the comparison body, and wherein said means for displaying is operatively coupled to said drive means.

20. An instrument as claimed in claim 19, wherein said means for adjusting includes drive means for displacement of the comparison body, and wherein said means for displacing is operatively coupled to said drive means.

21. An instrument as claimed in claim 19, wherein said means for displaying is a drum counter.

22. An instrument as claimed in claim 20, wherein said means for displaying is a drum counter.

23. An instrument as claimed in claim 19, wherein said means for displacing is an electronic digital counter.

24. An instrument as claimed in claim 20, wherein said means for displaying is an electronic digital counter.

25. An instrument as claimed in any one of claims 19, 20, 21, 22, 23 or 24, further comprising an operational amplifier electrically connected to said means for measuring and controlling said drive means.

* * * * *